US012535199B1

(12) United States Patent
Moore

(10) Patent No.: US 12,535,199 B1
(45) Date of Patent: Jan. 27, 2026

(54) LIGHT MOUNT PANEL

(71) Applicant: Scott Moore, Nashville, TN (US)

(72) Inventor: Scott Moore, Nashville, TN (US)

( * ) Notice: Subject to any disclaimer, the term of this patent is extended or adjusted under 35 U.S.C. 154(b) by 24 days.

(21) Appl. No.: 19/042,350

(22) Filed: Jan. 31, 2025

Related U.S. Application Data

(60) Provisional application No. 63/560,990, filed on Mar. 4, 2024.

(51) Int. Cl.

| | |
|---|---|
| ***F21V 21/14*** | (2006.01) |
| ***F21S 4/22*** | (2016.01) |
| ***F21V 21/088*** | (2006.01) |
| *F21W 131/406* | (2006.01) |
| *F21Y 115/10* | (2016.01) |

(52) U.S. Cl.
CPC ................ *F21V 21/14* (2013.01); *F21S 4/22* (2016.01); *F21V 21/088* (2013.01); *F21W 2131/406* (2013.01); *F21Y 2115/10* (2016.08)

(58) Field of Classification Search
CPC ........... F21V 21/14; F21V 21/088; F21S 4/22
See application file for complete search history.

(56) References Cited

U.S. PATENT DOCUMENTS

| | | | | |
|---|---|---|---|---|
| 10,551,039 | B2 | 2/2020 | Moore | |
| 11,226,075 | B1 * | 1/2022 | Lee | F21S 4/20 |
| 11,293,625 | B2 | 4/2022 | Moore | |
| 2020/0211424 | A1 * | 7/2020 | Taylor | G09F 3/208 |
| 2022/0146061 | A1 * | 5/2022 | Koivisto | H10H 20/8582 |
| 2022/0325875 | A1 * | 10/2022 | Pang | F21V 21/088 |
| 2022/0397247 | A1 * | 12/2022 | Monsonego | F21V 3/049 |
| 2023/0003369 | A1 * | 1/2023 | Goettle | F21V 14/02 |

* cited by examiner

*Primary Examiner* — Christopher E Dunay
(74) *Attorney, Agent, or Firm* — Shane Cortesi

(57) ABSTRACT

Light mount panels are described. The panels may include left and right hinges to allow adjacent panels to hingedly connect to each other and attach to a curved structure such as an arch. Each panel may also include a light mount slots that receives (preferably removably receives) a flexible lighting strip, and one or more clamp slots that allow a clamp to attach the panel to the curved structure.

20 Claims, 9 Drawing Sheets

LIGHT MOUNT PANEL

BACKGROUND

Technical Field

The present invention relates to light mounts, such as light mount panels that may be hingedly joined together to removably connect lighting strips to trusses and other curved structures.

Background of the Invention

Flexible LED lighting strips are often used in concerts and corporate events to light the stage. For example, the present inventor invented and sells a product through his company Go Live Productions, LLC (Nashville, Tennessee) under the brand EDGELIGHT RGB that is used to light the stage of event floors. Such lights are described in U.S. Pat. Nos. 10,551,039 and 11,293,625.

Often such venues include curved trusses, e.g., arch-shaped trusses, over the stage. There is a need for lighting mounts to attach to such trusses.

BRIEF DESCRIPTION OF THE DRAWINGS

in FIG. 10, the clamp is attached to the vertical mount slot.

in FIG. 12, the clamp is attached to the horizontal mount slot.

in FIG. 14, the clamp is attached to the vertical mount slot.

in FIG. 15, the clamp is attached to the horizontal mount slot.

SUMMARY OF THE INVENTION

Figure 1:
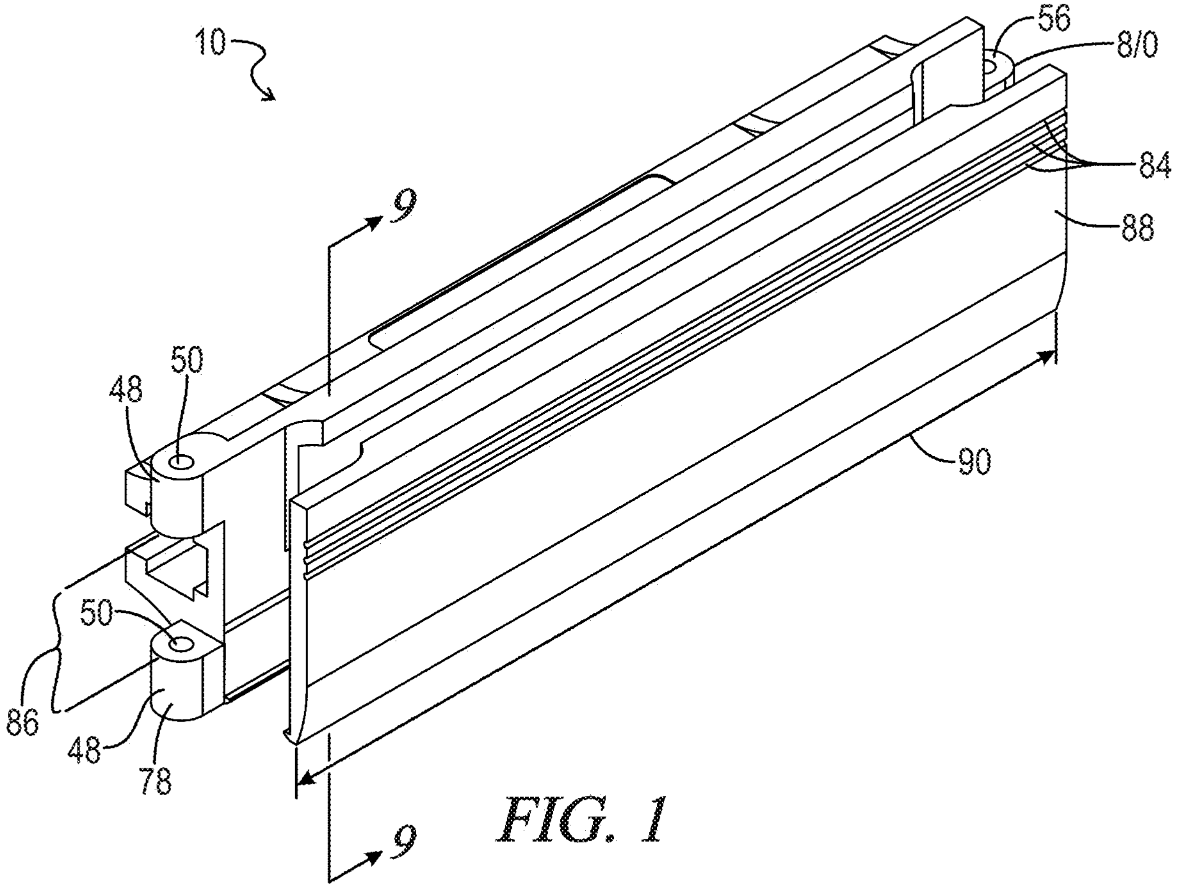
FIG. 1 illustrates a front perspective view of a light mount panel in accordance with an embodiment of the present invention.
Figure 2:
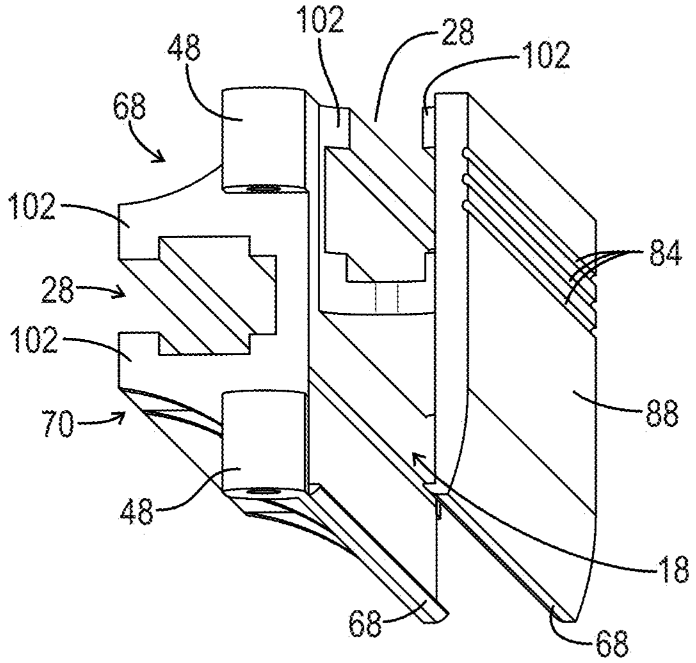
FIG. 2 illustrates a side, perspective view of the light mount panel of FIG. 1.
Figure 3:
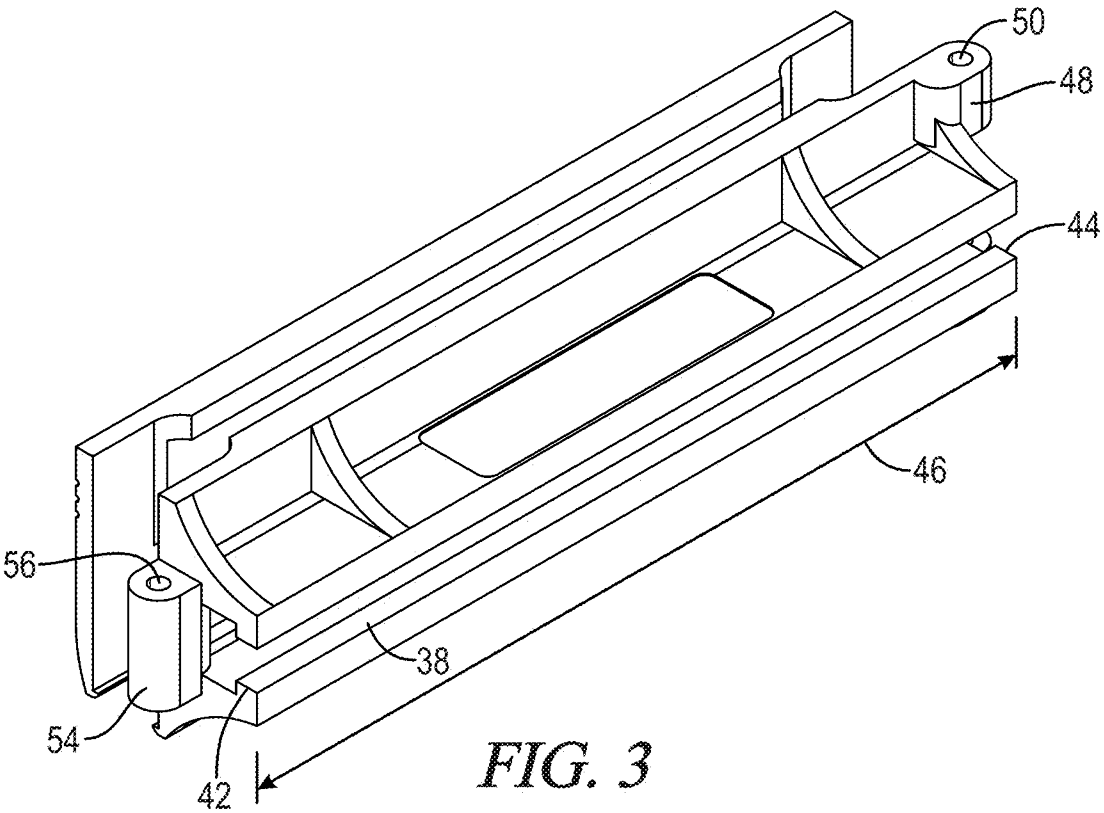
FIG. 3 illustrates a rear, perspective view of the light mount panel of FIG. 1.
Figure 4:
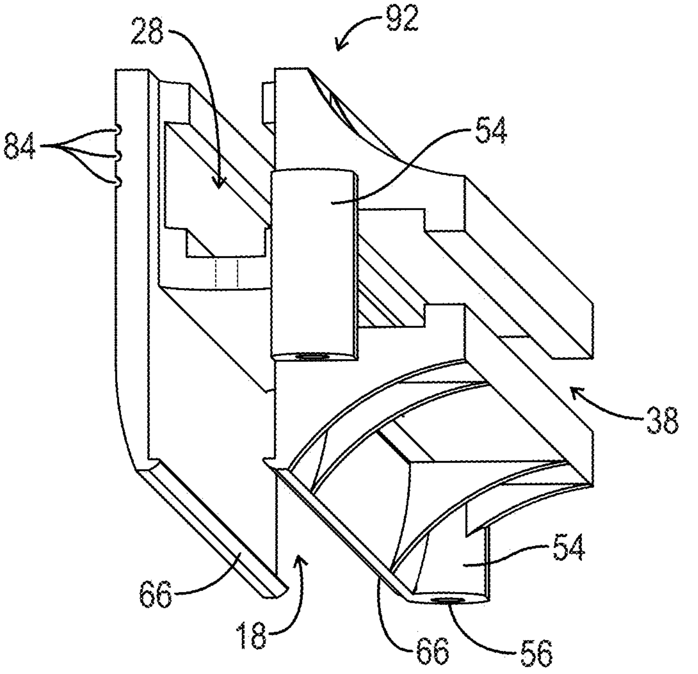
FIG. 4 illustrates another side, perspective view of the light mount panel of FIG. 1.

In some embodiments, the present disclosure provides a series of hingedly connected panels that attach to a curved structure such as an arch. Optionally, each panel comprises a light mount slot/channel that receives (preferably removably receives) a flexible lighting strip. Optionally, a clamp attaches the panel to the curved structure.

DETAILED DESCRIPTION

Certain preferred embodiments are shown in FIGS. 1-15 of the drawings where light mount panels are generally designated by the numeral 10. It will be understood that variations of the apparatuses shown in the illustrations are possible and that features can be combined in any suitable combination. All dimensions provided in the drawings (which are in inches) are exemplary. The drawings are CAD drawings and are generally drawn to scale. However, other dimensions are possible. It will be appreciated that the light mount panels 10 may assume different orientations in use.

In some embodiments, the present disclosure provides a kit comprising two or more light mount panels 10 that are configured to hingedly attach to each other and mount to a curved structure such as an arch 74.

Optionally, the light mount panels 10 are provided in a kit that comprises two or more identically-shaped and/or identically-sized panels 10 so that the panels 10 can be attached interchangeably. Optionally, such kits can also include panels 10 with different features (if desired).

Figure 5:
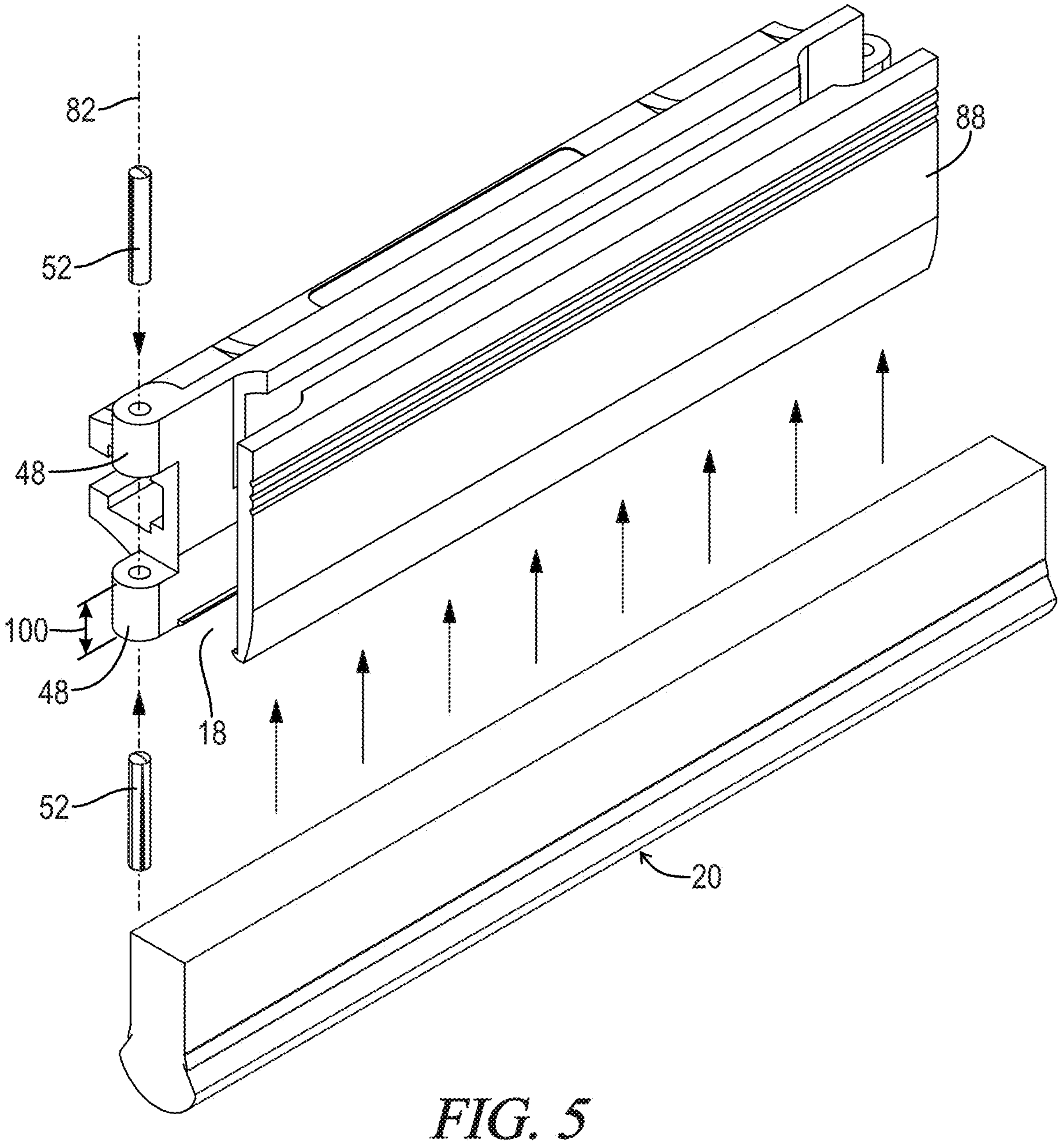
FIG. 5 illustrates a front, perspective view of the light mount panel of FIG. 1 and a flexible light strip being inserted into the light mount slot/channel of the panel.
Figure 6:
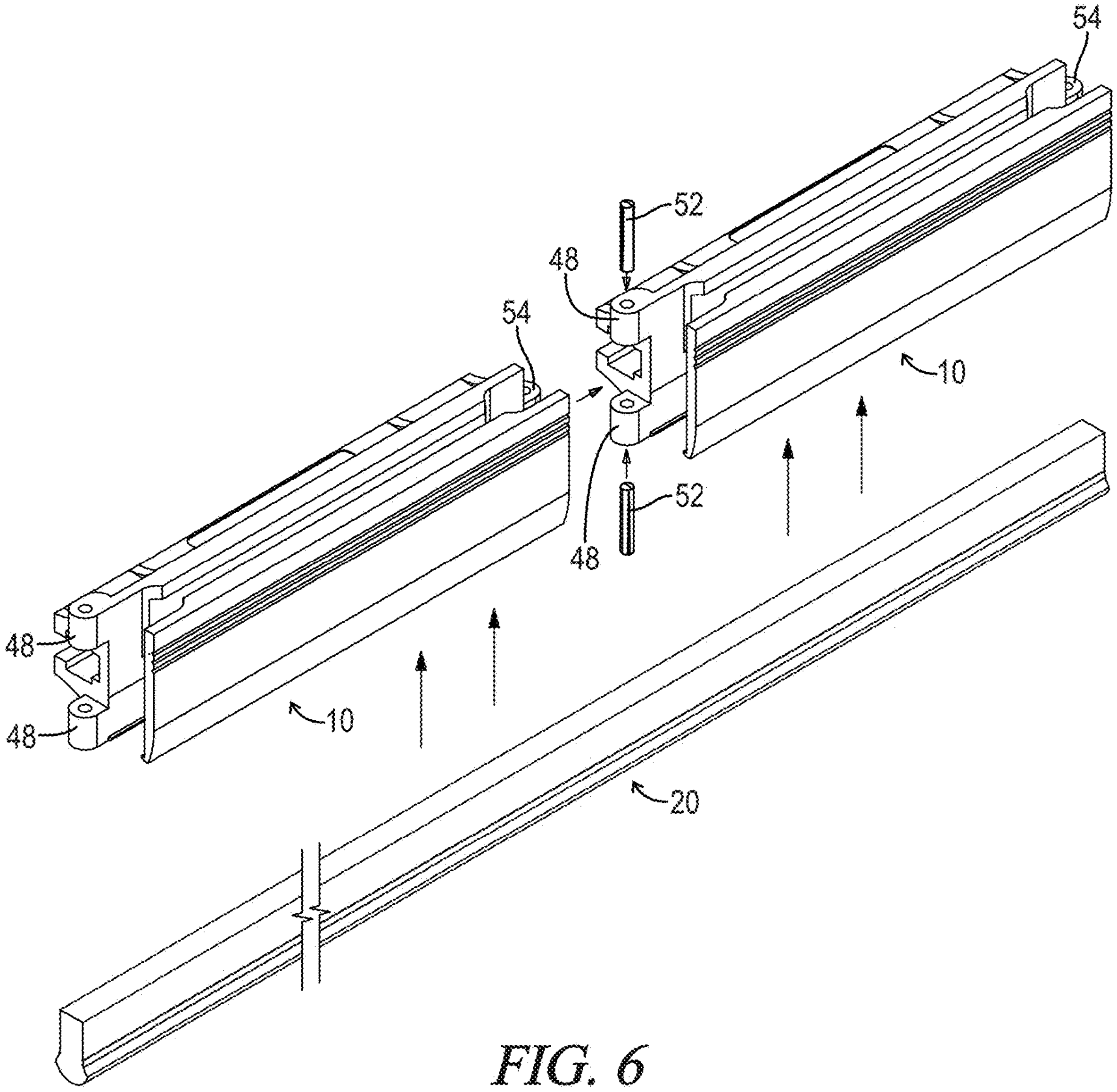
FIG. 6 illustrates a front, perspective view of a flexible light strip two light mount panel being attached together in accordance with an embodiment of the present invention.
Figure 7:
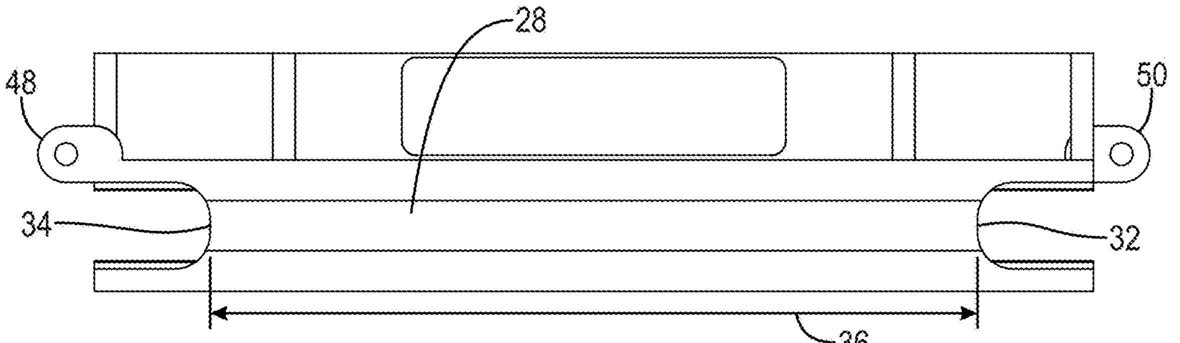
FIG. 7 illustrates a top plan view of the light mount panel of FIG. 1.
Figure 8:
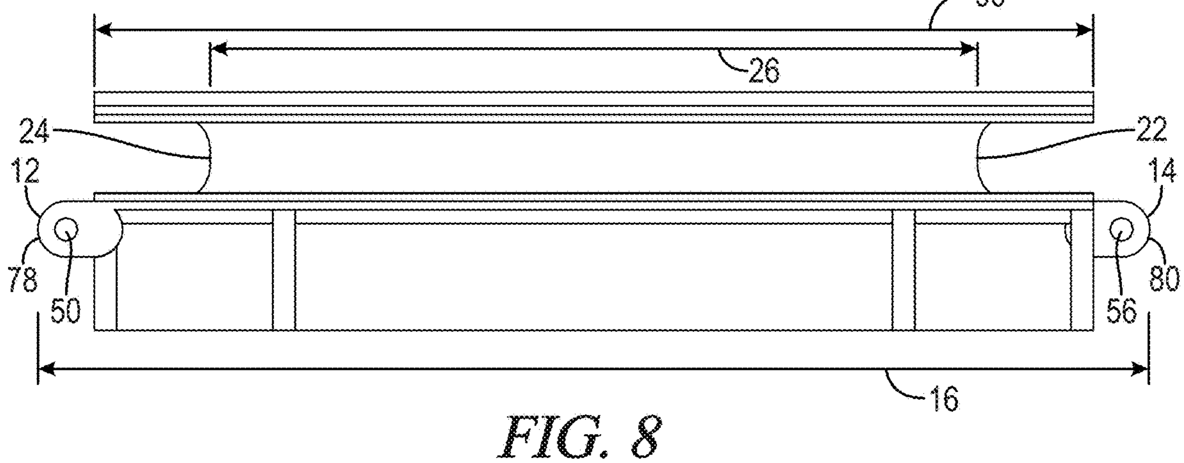
FIG. 8 illustrates a bottom plan view of the light mount panel of FIG. 1.
Figure 9:
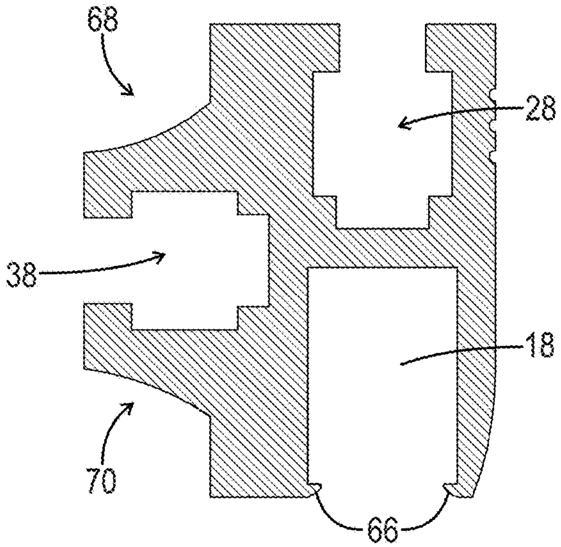
FIG. 9 illustrates a sectional view of the light mount panel of FIG. 1 taken along 9-9 of FIG. 1.

Optionally, each panel 10 comprises a light mount slot/channel 18 that receives (preferably removably receives) a flexible lighting strip 20, as shown in FIGS. 5-6 for example.

Figure 10:
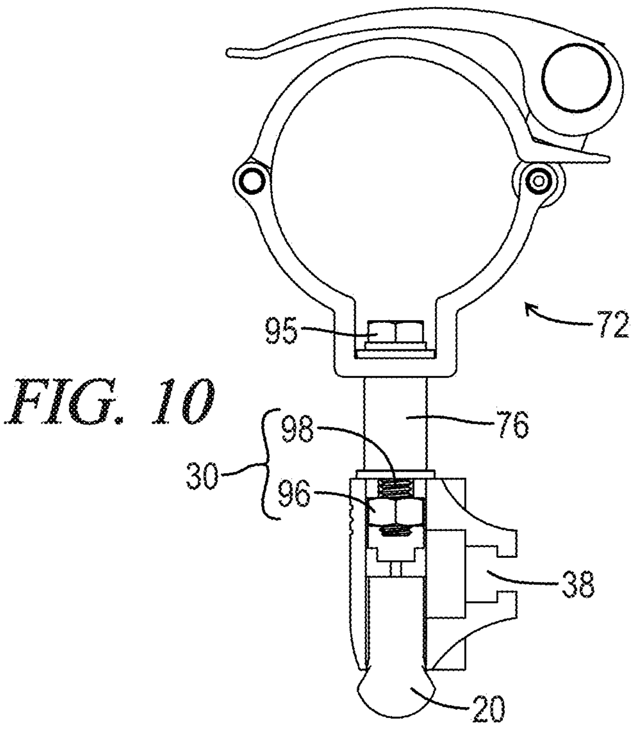
FIG. 10 illustrates a side elevation of a clamp, as well as flexible light strip, attached to the light mount panel of FIG. 1 in accordance with an embodiment of the present invention.
Figure 11:
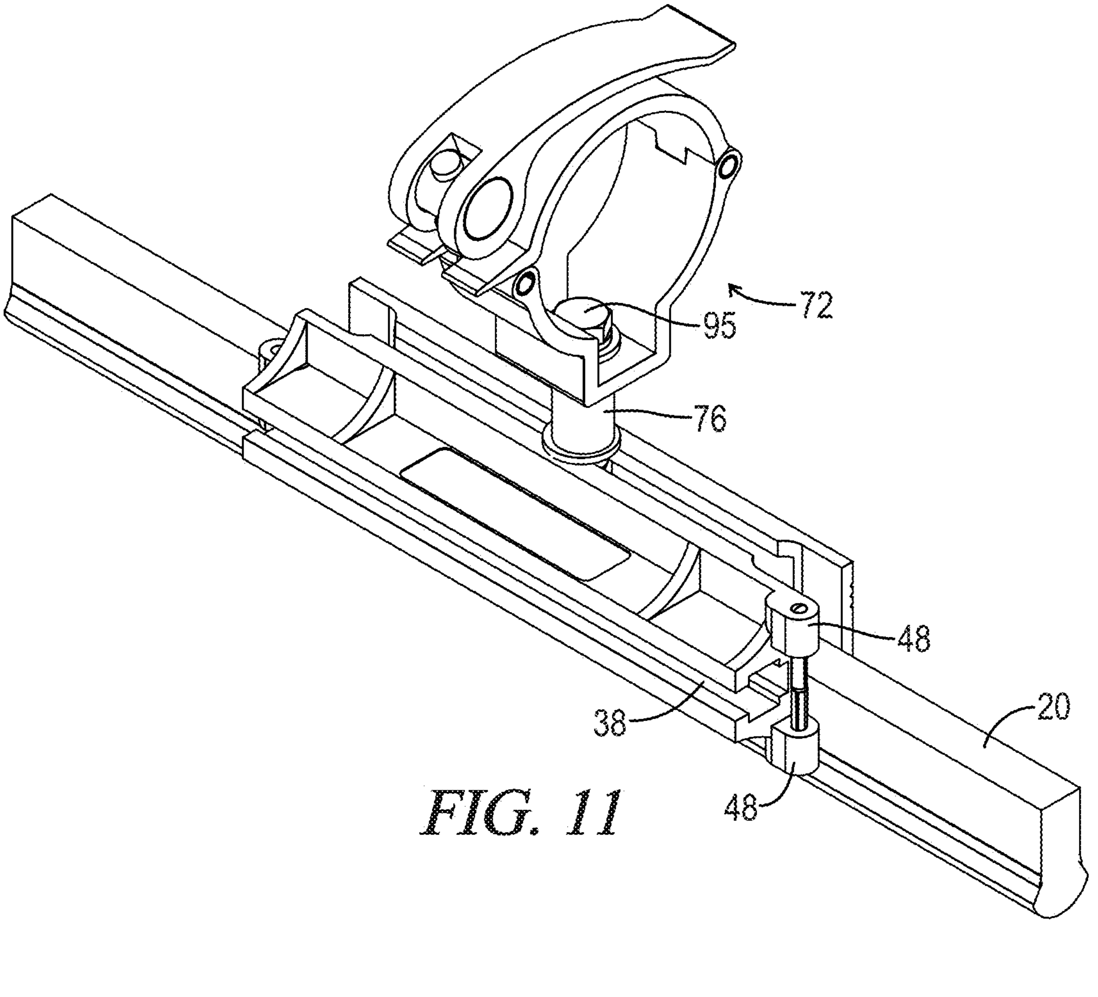
FIG. 11 illustrates a rear perspective view of the clamp, light mount panel, and flexible light strip of FIG. 10.
Figure 12:
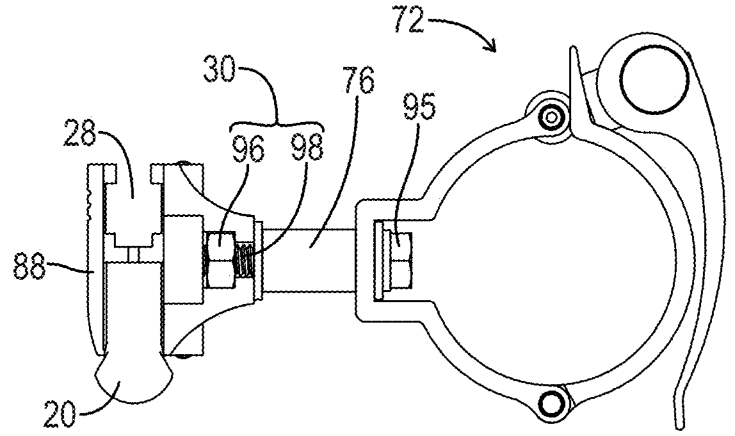
FIG. 12 illustrates a side elevation of a clamp, as well as flexible light strip, attached to the light mount panel of FIG. 1 in accordance with an embodiment of the present invention.
Figure 13:
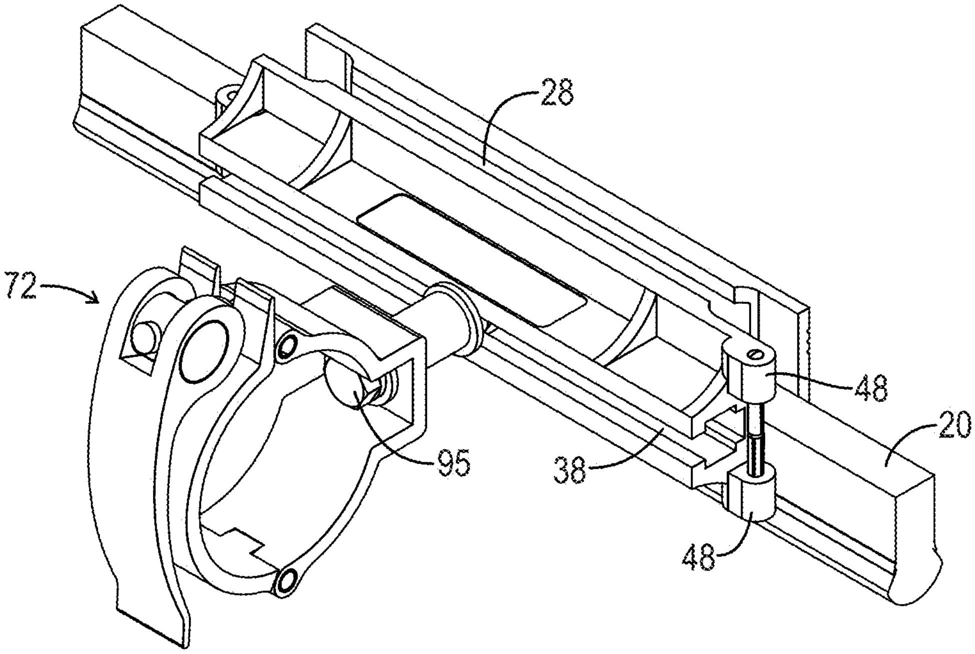
FIG. 13 illustrates a rear perspective view of the clamp, light mount panel, and flexible light strip of FIG. 12.
Figure 14:
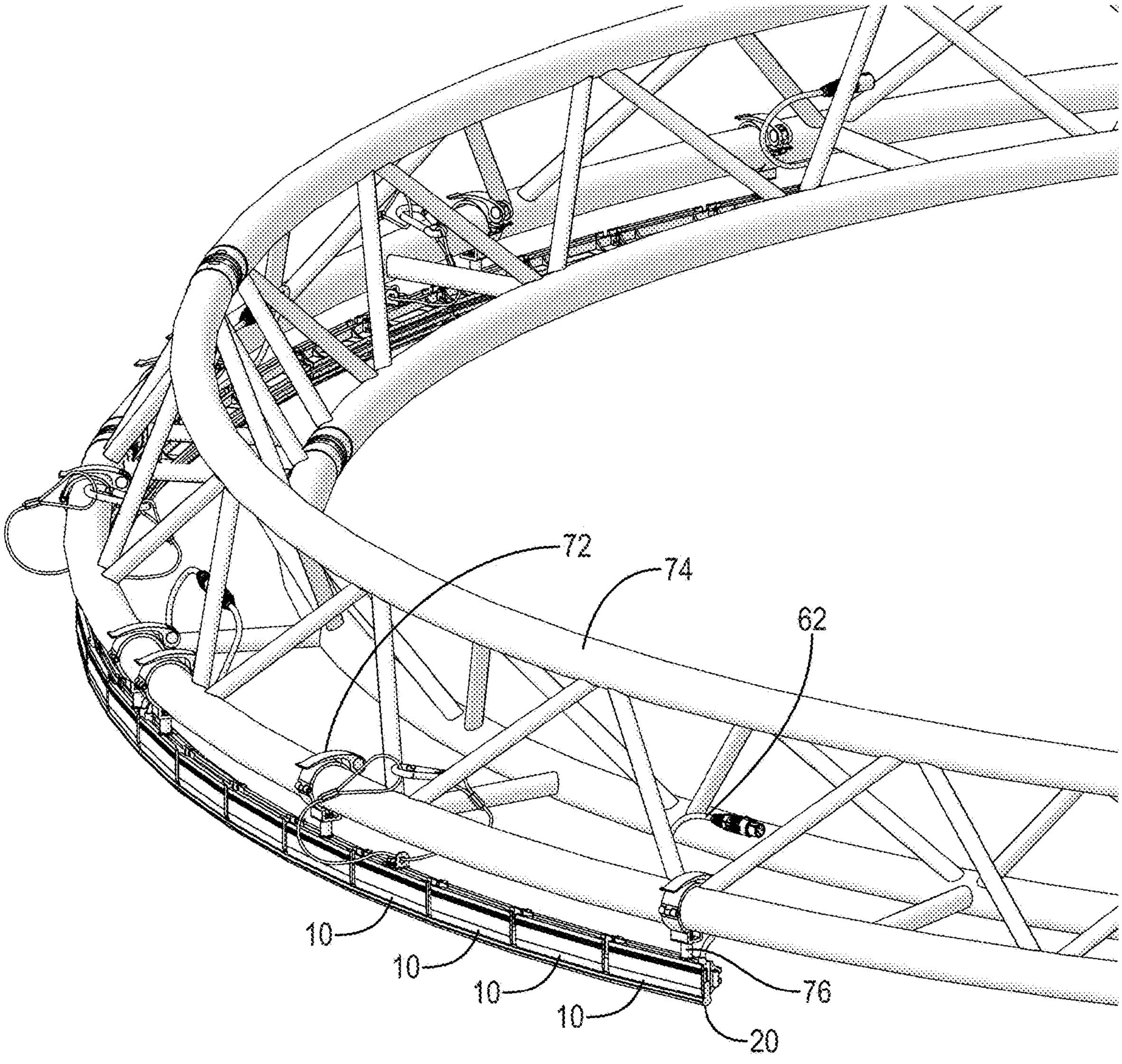
FIG. 14 illustrates a perspective view of a series of hingedly-attached light mount panels comprising a flexible light strip attached to a truss via clamps in accordance with an embodiment of the present invention.
Figure 15:
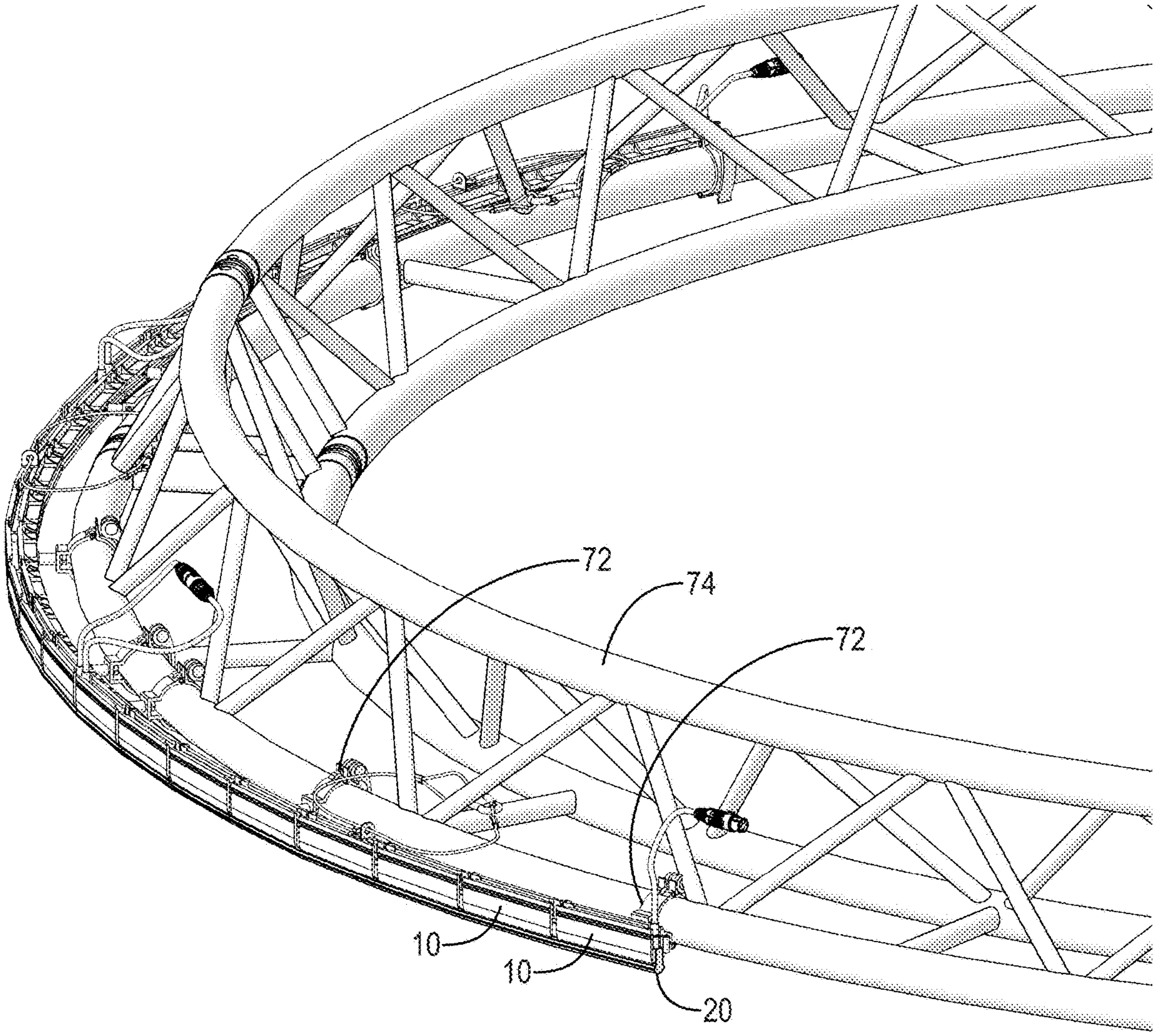
FIG. 15 illustrates a perspective view of a series of hingedly-attached light mount panels comprising a flexible light strip attached to a truss via clamps in accordance with an embodiment of the present invention.

Optionally, as shown in FIGS. 10-11, each panel 10 comprises a vertical mount slot 28 that receives a protrusion/extension 30 of a clamp 72 and is located approximately 180 degrees relative to (e.g., directly above or directly below) the light mount slot 18 to allow for vertical lighting (i.e., the lighting strip 20 to extend above or below an arch 74, for example, to shine light above or below a stage, for example). See FIG. 14, for example. Optionally, as shown in FIGS. 12-13, in addition to or in lieu of the vertical mount slot 28, each panel 10 comprises a horizontal mount slot 38 that receives a protrusion/extension 30 of a clamp 72 and is located approximately 90 degrees relative to the light mount slot 18 to allow for horizontal lighting (i.e., the lighting strip 20 to extend laterally from the arch 74 for example to shine light laterally relative to a stage for example). See FIG. 15, for example. Optionally, the vertical and horizontal mount slots 28/38 include a lip 102 to keep the clamp 72 in the slots 28/38. For example, optionally, the vertical and horizontal mount slots 28/38 and the clamp protrusions 30 are t-shaped as shown in the drawings. Optionally, each light mount panel 10 includes a left hinge to allow the light mount panel 10 to attach to the right hinge of an adjacent light mount panel 10 and a right hinge to allow the light mount panel 10 to attach to the left hinge of a different adjacent light mount panel 10 so that the light mount panels 10 can be assembled in a series, as shown in FIGS. 14-15.

More particularly, in some embodiments, the present disclosure provides a light mount panel 10 comprising one or more of the following features: a mount left end 12; a mount right end 14; a mount length 16 extending from the left end 12 to the right end 14; a light mount slot 18 configured to receive a lighting strip 20 (e.g., a flexible lighting strip, e.g., a flexible LED strip), the light mount slot 18 optionally comprising a light mount slot right end 22 (which may be open), a light mount slot left end 24 (which may be open) and a light mount slot length 26 extending parallel to the mount length 16, a vertical mount slot 28 configured to receive a vertical clamp protrusion 30, the vertical mount slot 28 optionally, oriented approximately 180 degrees from the light mount slot 18, the vertical mount slot 28 optionally comprising a vertical mount slot right end 32 (which may be open), a vertical mount slot left end 34 (which may be open) and a vertical mount slot length 36 extending parallel to the mount length 16; a horizontal mount slot 38 configured to receive a horizontal clamp protrusion 40, the horizontal mount slot 38 optionally oriented approximately 90 degrees from the light mount slot 18 and the vertical mount slot 28, the horizontal mount slot 38 comprising a horizontal mount slot right end 42 (which may be open), a horizontal mount slot left end 44 (which may be open) and a horizontal mount slot length 46 extending parallel to the mount length 16.

Optionally, the light mount panel 10 further comprises a left hinge that may be located at the mount left end 12 and a right hinge that may be located at the mount right end 14. For example, as shown in the illustrations, the left hinge may include at least one left hinge tab 48 that may be located at the mount left end 12 and may include a hinge pin hole 50 (which may be cylindrical and may be configured to receive a cylindrical hinge pin 52). Further, as shown in the illustrations, the right hinge may include at least one right hinge tab 54 that may be located at the mount right end 14 and may include a hinge pin hole 100 (which may be cylindrical and may be configured to receive a cylindrical hinge pin 52).

Optionally, a flexible lighting strip 20 (e.g., a flexible generally rectangular lighting strip with a dome, as shown in FIGS. 5-6, and 11-15 for example.) is located (preferably removably placed) in the light mount slot 18. Optionally, the light mount slot 18 is u-shaped. For example, as shown in the illustrations, the light mount slot 18 may have a generally rectangular cross-section with a top lip/protrusion 66 on a front side and a rear side of the light mount slot 18 configured to hold the flexible lighting strip 20 in the light mount slot 18. For example, the top lip/protrusion 66 may mate with a small notch in the flexible lighting strip 20 that allows the flexible lighting strip 20 to stay in place.

Optionally, as shown in the illustrations, the lighting strip 20 has a left power cable 62 that is configured to connect to a power source and power the lighting strip 20 and a right power cable 62 that is configured to connect to a power source and power the lighting strip 20 and the left hinge tab 48 is located to the left of the light mount slot open left end 24 and the right hinge tab 54 is located to the right of the light mount slot open right end 22 (to accommodate the right and left power cables 62).

Optionally, the light mount slot 18 comprises a light mount slot depth perpendicular to the light mount slot length 16. Optionally, the hinge pin holes 50/56 comprise a hinge pin hole depth 100 parallel to the light mount slot depth. Optionally, the at least one left hinge tab 48 comprises a radiused left end 78 and the at least one right hinge tab 54 comprises a radiused right end 80. Optionally, the light mount panel 10 comprises one left hinge tab 48, and two right hinge tabs 54 that may be separated by a hinge tab recess 86. Optionally, one of the right hinge tabs 54 is located above the left hinge tab 48 and the other of the right hinge tabs 54 is located below the left hinge tab 48. Alternatively, the light mount panel 10 may comprise one right hinge tab 54, and the two left hinge tabs 48 separated by a hinge tab recess 86. Optionally, one of the left hinge tabs 48 is located above the right hinge tab 54 and the other of the left hinge tabs 48 is located below the right hinge tab 54, again to allow adjacent panels 10 to mate.

Optionally, as shown in the illustrations, the light mount panel 10 comprises a front side 88 opposite the horizontal mount slot 38. Optionally, the front side 88 is substantially straight. Optionally, the front side 88 comprises a front side length 90 parallel to the light mount slot length 26 and the front side length 90 is greater than the light mount slot length 26. Optionally, the light mount panel 10 comprises an interior side 92 located to the rear of the front side 88 and to the front of the horizontal mount slot 38. Optionally, the interior side 92 is substantially straight and oriented parallel to the front side 88 and the panel length 16. Optionally, the light mount slot 18 is located between the interior side 92 and the front side 88. Optionally, the interior side 92 comprises an interior side length 94 parallel to the front side length 90. Optionally, the interior side length 94 (including the hinge tabs 48 and 54) is greater than the light mount slot length 26 (to allow for the power cables 62 to pass between the substantially straight front side 88 and the interior side 92).

Optionally, as shown in the illustrations, the light mount panel 10 comprises a first arc-shaped recess 68 between the horizontal mount slot 38 and the light mount slot 18; and/or a second arc-shaped recess 70 between the horizontal mount slot 38 and the vertical mount slot 28.

Optionally, a vertical clamp protrusion 30 is located in the vertical mount slot 28, and optionally the vertical clamp protrusion 30 is connected to a vertical clamp 72. Optionally, as shown in the illustrations, the vertical clamp 72 is generally circular in shape. Optionally, a horizontal clamp protrusion 40 is located in the horizontal mount slot 38, and optionally the horizontal clamp protrusion 40 is connected to a horizontal clamp 72. Optionally, as shown in the illustrations, the vertical or horizontal clamp 72 is removably attached to a truss 74 (e.g., an arch-shaped post forming the truss). Optionally, as shown in the illustrations, a spacer 76 is located between the vertical/horizontal clamp protrusion 30/40 and the vertical/horizontal clamp 72, the spacer 76 optionally comprising a length extending laterally from the vertical mount slot 28 or the horizontal mount slot 38, the spacer 76 optionally configured to allow the vertical/horizontal clamp 72 to extend beyond the light mount panel 10 in order to space the lighting strip 20 away from the truss 74 (or other structure). Optionally, as shown in FIGS. 10-15, the vertical/horizontal clamp protrusion 30/40 is comprised of a threaded rod 98 of a bolt 95 that passes through the spacer 76 and a nut 96, with a portion of the threaded rod 98 and nut 96 nested in the horizontal and vertical mount slots 28/38. Optionally, the head of the threaded rod 98 is attached to the vertical/horizontal clamp 30/40. Optionally, as shown in the illustrations, the interior side 92 comprises the at least one right hinge tab 54 and the at least one left hinge tab 48. Optionally, as shown in the illustrations, the at least one right hinge tab 54 and the at least one left hinge tab 48 are located to the rear of the light mount slot 18 and the substantially straight front side 88. Optionally, the front side 88 comprises a plurality of rows of hemispherical recesses 84 having a hemispheric length parallel to the mount length 16.

Optionally, as best seen in FIGS. 14-15, the present disclosure provides a plurality of light mount panels 10 comprising one or more features described above hingedly attached to each other. For example, hinge pins 52 may be positioned through the hinge pin holes 100 of adjacent at least one left hinge tab 48 and at least one right hinge tab 54 of adjacent light mount panels 10 to allow the light mount panels 10 to pivot relative to each other along a pivot axis 82 extending through the hinge pin holes 100. Optionally, a single flexible lighting strip 20 spans across multiple adjacent light mount panels 10. Optionally, the plurality of light mount panels 10 are mounted to an arc-shaped truss 74 to form an arc-shaped lighting fixture suspended over a stage. Optionally, the plurality of light mount panels 10 are mounted to the arc-shaped truss 74 by a plurality of clamps 72, optionally, with at least one horizontal/vertical clamp 72 mounting each light mount panel 10 to the arc-shaped truss 74.

In still further embodiments, the present disclosure provides a method of using the light mount panels 10 described herein comprising providing a plurality of the panels 10, hingedly attaching the panels together (e.g., via the hinge pins 100) and mounting said panels 10 to an arc-shaped truss 74 by a plurality of clamps 72.

PARTS LIST

Light mount panel 10
Light mount left end 12
Light mount right end 14
Light mount length 16
Light mount slot 18
Lighting strip 20
Light mount slot right end 22
Light mount slot left end 24
Light mount slot length 26
Vertical mount slot 28
Vertical clamp protrusion 30
Vertical mount slot right end 32
Vertical mount slot left end 34
Vertical mount slot length 36
Horizontal mount slot 38
Horizontal clamp protrusion 40
Horizontal mount slot right end 42
Horizontal mount slot left end 44
Horizontal mount slot length 46
Left hinge tab 48
Left hinge tab hinge pin hole 50
Hinge pin 52
Right hinge tab 54
Right hinge tab hinge pin hole 56
Power cable 62
Light mount slot top lip 66
First arc-shaped recess 68
Second arc-shaped recess 70
Clamp 72
Truss 74
Spacer 76
Left hinge tab radiused left end 78
Right hinge tab radiused right end 80
Pivot axis 82
Hemispherical recess 84
Hinge tab recess/gap 86
Front side 88
Front side length 90
Interior side 92
Interior side length 94
Head of bolt 95
Nut 96
Threaded rod 98
Hinge pin hole depth 100
Lip 102

Those skilled in the art will understand how to make changes and modifications to the disclosed embodiments to meet their specific requirements or conditions. Changes and modifications may be made without departing from the scope and spirit of the invention. In addition, the steps of any method described herein may be performed in any suitable order and steps may be performed simultaneously if needed. Use of the singular embraces the plural.

Terms of degree such as "generally", "substantially", "about", and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

What is claimed is:

1. A kit comprising at least two light mount panels comprising:
a mount left end,
a mount right end,
a mount length extending from the left end to the right end,
a light mount slot configured to receive a lighting strip, the light mount slot comprising a light mount slot right end, a light mount slot left end and a light mount slot length extending parallel to the mount length,
a vertical mount slot configured to receive a vertical clamp protrusion, the vertical mount slot oriented approximately 180 degrees from the light mount slot, the vertical mount slot comprising a vertical mount slot right end, a vertical mount slot left end and a vertical mount slot length extending parallel to the mount length,
a horizontal mount slot configured to receive a horizontal clamp protrusion, the horizontal mount slot oriented approximately 90 degrees from the light mount slot and the vertical mount slot, the horizontal mount slot comprising a horizontal mount slot right end, a horizontal mount slot left end and a horizontal mount slot length extending parallel to the mount length,
a left hinge located at the mount left end; and
a right hinge located at the mount right end,
wherein the left hinge of a first light mount panel of the kit is configured to attach to the right hinge of a second light mount panel of the kit when the right hinge of the first light mount panel is not attached to the left hinge of the second light mount panel, and wherein the right hinge of the first light mount panel is configured to attach to the left hinge of the second light mount panel when the left hinge of the first light mount panel is not attached to the right hinge of the second light mount panel.

2. The kit of claim 1 wherein the kit further comprises a plurality of clamps configured to removably attach to the vertical mount slot or the horizontal mount slot of the at least at least two light mount panels.

3. The kit of claim 2 wherein the clamps comprise a protrusion configured to be positioned in the vertical mount slot or the horizontal mount slot of the at least two light mount panels.

4. The kit of claim 3 wherein, for the at least two light mount panels, the horizontal mount slot and the vertical mount slot each comprise a lip.

5. The kit of claim 4 wherein the clamp protrusions, horizontal mount slot and vertical mount slot are t-shaped.

6. The kit of claim 1 wherein, for the at least two light mount panels, the light mount slot left end and light mount slot right end are open.

7. The kit of claim 1 wherein, for the at least two light mount panels, the horizontal mount slot left end and right end and vertical mount slot left end and right end are open.

8. The kit of claim 1 wherein the left hinge of the first light mount panel of the kit is attached to the right hinge of the second light mount panel of the kit by one or more hinge pins extending through the left hinge of the first light mount panel and the right hinge of the second light mount panel.

9. The kit of claim 1 further comprising one or more left hinge pins configured to extend through and connect the left hinge of the first light mount panel when the right hinge of the first light mount panel is not attached to the left hinge of the second light mount panel, and the right hinge of the second light mount panel and one or more right hinge pins configured to extend through and connect the right hinge of the first light mount panel to the left hinge of the second light mount panel when the left hinge of the first light mount panel is not attached to the right hinge of the second light mount panel.

10. The kit of claim 1 wherein, for the at least two light mount panels, the left hinge comprises at least one left hinge tab located at the mount left end and comprising a hinge pin hole configured to receive a hinge pin; and the right hinge comprises at least one right hinge tab located at the mount right end and comprising a hinge pin hole configured to receive a hinge pin.

11. The kit of claim 10 wherein, for the at least two light mount panels, the left hinge tab is located to the left of the light mount slot open left end and the right hinge tab is located to the right of the light mount slot open right end.

12. The kit of claim 10 wherein, for the at least two light mount panels, the light mount slot comprises a light mount slot depth perpendicular to the light mount slot length, and the hinge pin holes comprise a hinge pin hole depth parallel to the light mount slot depth.

13. The kit of claim 10 wherein, for the at least two light mount panels, wherein the left hinge comprises one left hinge tab, wherein the right hinge comprises two right hinge tabs separated by a hinge tab recess and further wherein one of the right hinge tabs is located above the left hinge tab and the other of the right hinge tabs is located below the left hinge tab.

14. The kit of claim 10 wherein, for the at least two light mount panels, the right hinge comprises one right hinge tab, wherein the left hinge comprises two left hinge tabs separated by a hinge tab recess and further wherein one of the left hinge tabs is located above the right hinge tab and the other of the left hinge tabs is located below the right hinge tab.

15. The kit of claim 10 wherein, for the at least two light mount panels, the light mount panel comprises a front side opposite the horizontal mount slot, wherein the front side is substantially straight and comprises a front side length parallel to the light mount slot length, wherein the front side length is greater than the light mount slot length.

16. The kit of claim 15 wherein, for the at least two light mount panels, the light mount panel comprises an interior side located to the rear of the front side and to the front of the horizontal mount slot, wherein the interior side is substantially straight, wherein the light mount slot is located between the interior side and the front side, wherein the interior side comprises an interior side length parallel to the front side length, and further wherein the interior side length is greater than the light mount slot length, wherein the interior side comprises the at least one right hinge tab and the at least one left hinge tab, wherein the at least one right hinge tab and the at least one left hinge tab are located to the rear of the light mount slot and the front side.

17. The kit of claim 1 wherein, for the at least two light mount panels, a flexible lighting strip is located in the light mount slot.

18. The kit of claim 17 wherein the flexible lighting strip comprises a power cable configured to couple the flexible lighting strip to a power source to power the flexible lighting strip.

19. The kit of claim 1 wherein, for the at least two light mount panels, the light mount slot is u-shaped.

20. The kit of claim 19 wherein the light mount slot has a generally rectangular cross-section with a top lip on a front and a rear side of the light mount slot configured to hold the flexible lighting strip in the light mount slot.

* * * * *